(12) United States Patent
Markgraf et al.

(10) Patent No.: US 8,865,805 B2
(45) Date of Patent: Oct. 21, 2014

(54) TRIBOLOGICALLY MODIFIED GLASS-FIBER REINFORCED POLYOXYMETHYLENE

(71) Applicant: Ticona GmbH, Sulzbach am Taunus (DE)

(72) Inventors: Kirsten Markgraf, Weinheim (DE); Oliver Jünger, Mainz (DE); Ing. Joachim Flöck, Brechen (DE)

(73) Assignee: Ticona GmbH, Sulzbach am Taunus (DE)

( * ) Notice: Subject to any disclaimer, the term of this patent is extended or adjusted under 35 U.S.C. 154(b) by 0 days.

(21) Appl. No.: 13/650,452

(22) Filed: Oct. 12, 2012

(65) Prior Publication Data

US 2013/0102718 A1   Apr. 25, 2013

(30) Foreign Application Priority Data

Oct. 14, 2011   (EP) .................................. 11185167

(51) Int. Cl.
- *C08K 5/3492* (2006.01)
- *C08K 5/29* (2006.01)
- *C08L 71/00* (2006.01)

(52) U.S. Cl.
CPC .. *C08L 71/00* (2013.01); *C08K 5/29* (2013.01)
USPC .......................................... 524/100; 524/494

(58) Field of Classification Search
USPC .......................................... 524/354, 100, 494
See application file for complete search history.

(56) References Cited

U.S. PATENT DOCUMENTS

| | | | |
|---|---|---|---|
| 3,574,786 | A | 4/1971 | Ishida et al. |
| 4,111,887 | A | 9/1978 | Shaner et al. |
| 4,394,468 | A | 7/1983 | Lu |
| 4,493,751 | A | 1/1985 | Cherdron et al. |
| 4,652,594 | A | 3/1987 | Auerbach et al. |
| 4,828,755 | A | 5/1989 | Kusumgar et al. |
| 5,310,822 | A | 5/1994 | Kielhorn-Bayer et al. |
| 5,326,846 | A | 7/1994 | Nagai et al. |
| 5,530,061 | A | 6/1996 | Sanada et al. |
| 5,852,135 | A | 12/1998 | Kanai et al. |
| 5,889,102 | A | 3/1999 | Haack et al. |
| 5,977,229 | A | 11/1999 | Barth et al. |
| 6,046,141 | A | 4/2000 | Kurz et al. |
| 6,077,908 | A | 6/2000 | Yahiro et al. |
| 6,852,677 | B2 | 2/2005 | Kurz et al. |
| 7,256,966 | B2 | 8/2007 | Horio et al. |
| 2005/0043492 | A1 | 2/2005 | Chin et al. |
| 2005/0107513 | A1 | 5/2005 | Papke |
| 2007/0066746 | A1 | 3/2007 | Gunnewig et al. |
| 2007/0105989 | A1 | 5/2007 | Disch et al. |
| 2010/0022691 | A1 | 1/2010 | Katsuchi |
| 2011/0160372 | A1 | 6/2011 | Youm et al. |
| 2012/0157588 | A1 | 6/2012 | Markgraf et al. |

FOREIGN PATENT DOCUMENTS

| | | |
|---|---|---|
| CN | 101130621 | 2/2008 |
| CN | 101343396 | 1/2009 |
| CN | 101759955 | 6/2010 |
| DE | 2162345 | 12/1970 |
| DE | 2947490 | 6/1981 |
| EP | 1630198 | 3/2006 |
| GB | 1331829 | 9/1973 |
| JP | H47-041120 | 12/1972 |
| JP | S55-145529 | 11/1980 |
| JP | S56-105905 | 8/1981 |
| JP | H03-284675 | 12/1991 |
| JP | H06-179671 | 6/1994 |
| JP | H07-010871 | 1/1995 |
| JP | H07-033766 | 2/1995 |
| JP | H08-311351 | 11/1996 |
| JP | 11181232 | 7/1999 |
| JP | H11-181231 | 7/1999 |
| JP | H11/181232 | 7/1999 |
| JP | 2000-154181 | 6/2000 |
| JP | 2000-336241 | 12/2000 |
| JP | 2009-286874 | 12/2009 |
| JP | 2010-037445 | 2/2010 |
| JP | 2011-246566 | 12/2011 |
| KR | 100915000 | 9/2009 |
| KR | 20110078265 | 7/2011 |
| TW | 201033277 | 9/2010 |
| WO | WO 2006/105918 | 10/2006 |
| WO | WO 2010035351 | 4/2010 |
| WO | WO 2010-073529 | 7/2010 |

OTHER PUBLICATIONS

Kawaguchi, et al., "Tensile behavior of glass-fiber-filled polyacetal: Influence of the functional groups of polymer matrices"; Research and Development Center, Polyplastics Company Limited, Japan; *Journal of Applied Polymer Science* (2008), 107(1), 667-673.

Zhang et al., "Study on Property and Structure of Glass-Fiber-Reinforced Polyoxymethylene Composites"; The Center of Research and Development, Jushi Group Col, Ltd, Tongxiang, Peoples Republic of China; 2009; 37(4), 6-9.

Extended European Search Report of EP 10187617.5 dated Apr. 13, 2011.

Extended European Search Report of EP 11185172.1 dated Dec. 8, 2011.

*Primary Examiner* — Edward Cain

(74) *Attorney, Agent, or Firm* — Dority & Manning, P.A.

(57) ABSTRACT

The present invention relates to a molding composition, a process for the manufacturing of said molding composition, molded parts obtainable therefrom as well as the use of the molding composition for the manufacturing of molded parts used in the automotive industry, for housings, latches, window winding systems, wiper systems, sun roof systems, seat adjustments, levers, gears, claws, pivot housing or wiper arms.

20 Claims, No Drawings

TRIBOLOGICALLY MODIFIED GLASS-FIBER REINFORCED POLYOXYMETHYLENE

The present application claims priority to European Patent Application No. 11185167.1, filed Oct. 14, 2011, which is hereby incorporated by reference in its entirety.

The present invention relates to a tribologically modified molding composition, a process for the manufacturing of said molding composition, molded parts obtainable therefrom as well as the use of the molding composition for the manufacturing of molded parts used in the automotive industry, for housings, latches, window winding systems, pulleys, wiper systems, sun roof systems, seat adjustments, levers, gears, claws, pivot housing, brackets or wiper arms.

Polyacetal polymers, which are commonly referred to as polyoxymethylenes (POMs), have been established as exceptionally useful engineering materials in a variety of applications. Polyoxymethylene polymers are widely used in constructing molded parts, such as parts for use in the automotive industry and the electrical industry. Polyoxymethylene polymers, for instance, have excellent mechanical properties, fatigue resistance, abrasion resistance, chemical resistance, and moldability.

The superior mechanical properties of polyoxymethylene (POM) molding compositions are the reason for their use in numerous applications. To improve their properties, the polyoxymethylene homo- and -copolymers are provided with additives to adapt the properties to the application, for example by using reinforcing fibers.

In the past, polyoxymethylene polymers have been combined with a tribological modifier for producing polymer compositions well suited for use in tribological applications where the polymer article is in moving contact with metal parts or other plastic parts. For instance, tribological applications can include embodiments where the polyoxymethylene polymer is formed into gear wheels, pulleys or sliding elements, such as window panes. Of particular advantage, polyoxymethylene polymers when used in tribological applications have a low coefficient of friction and therefore generate very little frictional noise while also experiencing low wear.

Polyoxymethylene compositions that are formulated for tribological applications, for instance, are disclosed in U.S. Patent Application Publication No. U.S. 2007/0105989, which is incorporated herein by reference.

Although modified polyoxymethylene compositions have been found to be well suited in tribological applications, further improvements are needed. In particular, a need exists for a polyoxymethylene composition well suited for use in tribological applications that has improved strength and toughness. For example, in some applications added strength and toughness is needed in addition to tribological properties.

In the past, in order to increase the strength and toughness of polyoxymethylene polymers, the polymers have been combined with reinforcing agents, such as glass fibers. Fiber reinforced polyoxymethylene compositions, for instance, are disclosed in U.S. Pat. No. 4,111,887, U.S. Pat. No. 4,394,468 and U.S. Pat. No. 5,889,102, which are both incorporated herein by reference. Incorporating reinforcing fibers into polyoxymethylene compositions have provided some improvements in strength. Further improvements, however, are still needed. In particular, a need exists for a fiber reinforced polyoxymethylene composition well suited for use in tribological applications that has enhanced strength and toughness by improving compatibility between the reinforcing fibers and the polymer material.

However, the effect of these additives on the properties of the molding composition is affected by the coupling of the additive to the plastics matrix. Attempts to couple glass fibers to a polyoxymethylene matrix are known in the prior art.

DE 2162345 discloses a thermoplastic composition comprising a polyoxymethylene, an isocyanate coupling agent and reinforcing glass fibers wherein the glass fibers are sized with aminoalkylsilane compounds. The diisocyanate coupling agent is used to improve the compatibility of the polyoxymethylene matrix with the reinforcing fibers.

Isocyanate coupling agents are highly reactive with nucleophilic groups such as OH or $NH_2$ groups. Therefore, the use of further additives to reinforce polyoxymethylene compositions which comprise coupling agents on basis of isocyanates are limited.

US 2005/0107513 tries to avoid these problems and uses a catalyst which catalyses the chemical reaction between the polyacetal matrix polymer and the surface of the additive, i.e. the glass fiber. Thus, the use of a coupling agent is avoided. However, coupling agents such as isocyanates are very effective and contribute to the mechanical properties of the fiber reinforced polyoxymethylene compositions. On the other hand, sensitive additives which can react with the coupling agents were believed to be avoided. Consequently, additives which reduce the formaldehyde emission have not been used in the prior art for fiber reinforced polyoxymethylene molding compositions due to the presence of highly reactive isocyanate coupling agents.

U.S. Pat. No. 4,652,594 discloses a glass fiber-reinforced oxymethylene polymer molding composition comprising a blend of:

(a) a major portion of an oxymethylene polymer, (b) glass fibers in a reinforcing amount, (c) as a coupling agent for said glass fibers and said oxymethylene polymer, a minor but effective amount of at least one prepolymeric amino resin selected from condensation products of formaldehyde with at least one of guanidine, melamine, urea, guanamine or a substituted guanamine and having a degree of polymerization in the range of from about 2 to about 5, and (d) an amount of an acid catalyst effective to promote the cross-linking reactions of said amino resin.

JP 11181232 discloses a fiber-reinforced conductive polyacetal resin composition comprising 5 to 20 wt.-% of conductive carbon as a processing auxiliary.

The object of the present invention is the provision of a fiber reinforced polyoxymethylene composition which demonstrates improved mechanical properties while having excellent wear and sliding properties.

The present disclosure is generally directed to fiber reinforced polymer compositions. The polymer compositions generally contain a polyoxymethylene polymer, a reinforcing agent, and a tribological modifier as well as a coupling agent. The tribological modifier improves the wear properties of the material when used in tribological applications. The reinforcing fibers are present in order to increase strength and toughness. In accordance with the present disclosure, the composition further contains a coupling agent that improves the mechanical properties such as the impact strength, stress at break and strain at break. The relative amounts of the coupling agents and the tribological modifier can be adjusted in order to produce a polymer composition having the desired balance between strength, toughness, coefficient of friction, and wear properties.

It has surprisingly been found that fiber reinforced compositions which comprise at least one polyoxymethylene, at least one coupling agent, at least one reinforcing fiber and one or more tribological modifier, preferably at least ultrahigh molecular weight polyethylene (UHMW-PE), lead to a molding composition which has excellent mechanical properties and low wear as well as excellent sliding properties which are required for many applications especially in the automotive industry where the molding composition is formed into gear wheels, pulleys or sliding elements, such as window panes. Of particular advantage, polyoxymethylene polymers when used in tribological applications have a low coefficient of friction and therefore generate very little frictional noise while also experiencing low wear.

An embodiment of the present invention is a molding composition comprising
a) at least one polyoxymethylene (A),
b) at least one coupling agent (B),
c) at least one reinforcing fiber (C),
d) one or more tribological modifier (D), preferably an ultrahigh molecular weight polyethylene and
e) optionally at least one formaldehyde scavenger (E).

Component (A)

The molding composition according to the present invention comprises at least one polyoxymethylene (A) (hereinafter also referred to as "component (A)"). Component (A) of the molding composition according to the invention is a polyoxymethylene homo- or -copolymer. Preferably, the polyoxymethylene (A) has a high content of terminal hydroxyl groups and more preferably contains no low molecular weight constituents or only a small proportion thereof. Polyoxymethylene (A) preferably has terminal hydroxyl groups, for example hydroxyethylene groups (—OCH$_2$CH$_2$—OH) and hemi-acetal groups (—OCH$_2$—OH). According to a preferred embodiment, at least 25%, preferably at least 50%, more preferably at least 75% of the terminal groups of the polyoxymethylene (A) are hydroxyl groups, especially hydroxyethylene groups.

The content of hydroxyl groups end groups is especially preferred at least 80%, based on all terminal groups. Within the meaning of the present invention, the term "all terminal groups" is to be understood as meaning all terminal and—if present—all side terminal groups.

In addition to the terminal hydroxyl groups, the POM may also have other terminal groups usual for these polymers. Examples of these are alkoxy groups, formate groups, acetate groups or aldehyde groups. According to a preferred embodiment of the present invention the polyoxymethylene (A) is a homo- or copolymer which comprises at least 50 mol-%, preferably at least 75 mol-%, more preferably at least 90 mol-% and most preferably at least 95 mol-% of —CH$_2$O— repeat units.

It has been found that molding compositions which demonstrate an extremely high impact resistance can be obtained with a polyoxymethylene (A) which has low molecular weight constituents having molecular weights below 10,000 Dalton of less than 15% by weight, preferably less than 10% by weight, more preferably less than 7% by weight and most preferably less than 5% by weight, based on the total mass of the polyoxymethylene.

The "POM polymers" which can be used as polyoxymethylene (A) generally have a melt volume rate MVR of less than 50 cm$^3$/10 min, preferably ranging from 1 to 50 cm$^3$/10 min, further preferably ranging from 1 to 20 cm$^3$/10 min, more preferably ranging from 2 to 15 cm$^3$/10 min and especially ranging from 4 to 13 cm$^3$/10 min, determined according to ISO 1133 at 190° C. and 2.16 kg.

Preferably, polyoxymethylene (A) has a content of terminal hydroxyl groups of at least 5 mmol/kg, preferably at least 10 mmol/kg, more preferably at least 15 mmol/kg and most preferably ranging from 15 to 50 mmol/kg, especially from 18 to 40 mmol/kg, more especially 20 to 30 mmol/kg.

The content of terminal hydroxyl groups can be determined as described in K. Kawaguchi, E. Masuda, Y. Tajima, Journal of Applied Polymer Science, Vol. 107, 667-673 (2008).

The preparation of the polyoxymethylene (A) can be carried out by polymerization of polyoxymethylene-forming monomers, such as trioxane or a mixture of trioxane and dioxolane, in the presence of ethylene glycol as a molecular weight regulator. The polymerization can be effected as precipitation polymerization or in particular in the melt. Initiators which may be used are the compounds known per se, such as trifluoromethane sulfonic acid, these preferably being added as solution in ethylene glycol to the monomer. The procedure and termination of the polymerization and working-up of the product obtained can be effected according to processes known per se. By a suitable choice of the polymerization parameters, such as duration of polymerization or amount of molecular weight regulator, the molecular weight and hence the MVR value of the resulting polymer can be adjusted. The criteria for choice in this respect are known to the person skilled in the art. The above-described procedure for the polymerization leads as a rule to polymers having comparatively small proportions of low molecular weight constituents. If a further reduction in the content of low molecular weight constituents were to be desired or required, this can be affected by separating off the low molecular weight fractions of the polymer after the deactivation and the degradation of the unstable fractions after treatment with a basic protic solvent.

This may be a fractional precipitation from a solution of the stabilized polymer, polymer fractions of different molecular weight distribution being obtained.

Preference is also given to polyoxymethylene (A) which also is obtainable by polymerizing polyoxymethylene forming monomers in the presence of heteropoly acids.

In one embodiment, a polyoxymethylene polymer with hydroxyl terminal groups can be produced using a cationic polymerization process followed by solution hydrolysis to remove any unstable end groups. During cationic polymerization, a glycol, such as ethylene glycol can be used as a chain terminating agent. The cationic polymerization results in a bimodal molecular weight distribution containing low molecular weight constituents. In one embodiment, the low molecular weight constituents can be significantly reduced by conducting the polymerization using a heteropoly acid such as phosphotungstic acid as the catalyst. When using a heteropoly acid as the catalyst, for instance, the amount of low molecular weight constituents can be less than 2% by weight.

The heteropoly acid is a generic term for polyacids formed by the condensation of different kinds of oxo acids through dehydration and contains a mono- or poly-nuclear complex ion wherein a hetero element is present in the center and the oxo acid residues are condensed through oxygen atoms. Such a heteropoly acid is represented by the formula:

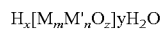

wherein

M represents an element selected from the group consisting of P, Si, Ge, Sn, As, Sb, U, Mn, Re, Cu, Ni, Ti, Co, Fe, Cr, Th and Ce, M' represents an element selected from the group consisting of W, Mo, V and Nb, m is 1 to 10, n is 6 to 40, z is 10 to 100, x is an integer of 1 or above, and y is 0 to 50.

The central element (M) in the formula described above may be composed of one or more kinds of elements selected from P and Si and the coordinate element (MT) is composed of at least one element selected from W, Mo and V, particularly W or Mo.

Specific examples of heteropoly acids are selected from the group consisting of phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts thereof.

Excellent results have been achieved with heteropoly acids selected from 12-molybdophosphoric acid ($H_3PMo_{12}O_{40}$) and 12-tungstophosphoric acid ($H_3PW_{12}O_{40}$) and mixtures thereof.

The heteropoly acid may be dissolved in an alkyl ester of a polybasic carboxylic acid. It has been found that alkyl esters of polybasic carboxylic acid are effective to dissolve the heteropoly acids or salts thereof at room temperature (25° C.).

The alkyl ester of the polybasic carboxylic acid can easily be separated from the production stream since no azeotropic mixtures are formed. Additionally, the alkyl ester of the polybasic carboxylic acid used to dissolve the heteropoly acid or an acid salt thereof fulfils the safety aspects and environmental aspects and, moreover, is inert under the conditions for the manufacturing of oxymethylene polymers.

Preferably the alkyl ester of a polybasic carboxylic acid is an alkyl ester of an aliphatic dicarboxylic acid of the formula:

$$(ROOC)-(CH_2)_n(COOR')$$

Wherein n is an integer from 2 to 12, preferably 3 to 6 and

R and R' represent independently from each other an alkyl group having 1 to 4 carbon atoms, preferably selected from the group consisting of methyl, ethyl, n-propyl, iso-propyl, n-butyl, iso-butyl and tert.-butyl.

In one embodiment, the polybasic carboxylic acid comprises the dimethyl or diethyl ester of the above-mentioned formula, such as a dimethyl adipate (DMA).

The alkyl ester of the polybasic carboxylic acid may also be represented by the following formula:

$$(ROOC)_2-CH-(CH_2)_m-CH-(COOR')_2$$

wherein m is an integer from 0 to 10, preferably from 2 to 4 and

R and R' are independently from each other alkyl groups having 1 to 4 carbon atoms, preferably selected from the group consisting of methyl, ethyl, n-propyl, iso-propyl, n-butyl, iso-butyl and tert.-butyl.

Particularly preferred components which can be used to dissolve the heteropoly acid according to the above formula are butantetracarboxylic acid tetratethyl ester or butantetracarboxylic acid tetramethyl ester.

Specific examples of the alkyl ester of a polybasic carboxylic acid are selected from the group consisting of dimethyl glutaric acid, dimethyl adipic acid, dimethyl pimelic acid, dimethyl suberic acid, diethyl glutaric acid, diethyl adipic acid, diethyl pimelic acid, diethyl suberic add, diemethyl phthalic acid, dimethyl isophthalic acid, dimethyl terephthalic acid, diethyl phthalic acid, diethyl isophthalic acid, diethyl terephthalic acid, butantetracarboxylic acid tetramethylester and butantetracarboxylic acid tetraethylester as well as mixtures thereof. Other examples include dimethylisophthalate, diethylisophthalate, dimethylterephthalate or diethylterephthalate.

Preferably, the heteropoly acid is dissolved in the alkyl ester of the polybasic carboxylic acid in an amount lower than 5 weight percent, preferably in an amount ranging from 0.01 to 5 weight percent, wherein the weight is based on the entire solution.

Further, polyoxymethylene (A) can also be a conventional oxymethylene homopolmyer and/or oxymethylene copolymer. As component (A) polyoxymethylenes are described for example in DE-A-2947490 which are generally unbranched linear polymers which contain as a rule at least 80%, preferably at least 90%, oxymethylene units (—$O_2$—O—). As mentioned before, the term polyoxymethylenes comprises both, homopolymers of formaldehyde or its cyclic oligomers, such as trioxane or 1,3,5,7-tetraoxacyclooctane, and corresponding copolymers. For example the following components can be used in the polymerization process: ethyleneoxide, 1,2-propyleneoxide, 1,2-butyleneoxide, 1,3-butyleneoxide, 1,3-dioxane, 1,3-dioxolane, 1,3-dioxepane and 1,3,6-trioxocane as cyclic ethers as well as linear oligo- or polyformales, like polydioxolane or polydioxepane.

Further, functionalized polyoxymethylenes which are prepared by copolymerization of trioxane and the formal of trimethylolpropane (ester), of trioxane and the alpha, alpha and the alpha, beta-isomers of glyceryl formal (ester) or of trioxane and the formal of 1,2,6-hexantriol (ester) can be used as polyoxymethylene (A).

Such POM homo- or copolymers are known per se to the person skilled in the art and are described in the literature.

The molding composition of the present invention preferably comprises polyoxymethylene (A) in an amount of up to 95 weight-%, preferably ranging from 40 to 90 weight-%, more preferably ranging from 55 to 85 weight-%, wherein the weight is based on the total weight of the molding composition.

Component (B)

As a further component, the molding composition of the present invention comprises at least one coupling agent (B) which is preferably a polyisocanate.

The coupling agent provides a linkage between the polyoxymethylene (A) and the reinforcing fiber and/or the sizing material which is coated on the reinforcing fiber (C). In principle any coupling agent which is capable to react with nucleophilic groups such as —OH or —$NH_2$ can be used.

Preferably, the coupling agent is added separately to the other components of the molding composition and can react during a reactive processing step with the other components of the composition.

Preferred are polyfunctional coupling agents, such as trifunctional or bifunctional agents.

The coupling agent improves the compatibility of the reinforcing fibers (C) with the polymer matrix. A suitable coupling agent (B) is a polyisocyanate, preferably organic diisocyanate, more preferably a polyisocyanate selected from the group consisting of aliphatic diisocyanates, cycloaliphatic diisocyanates, aromatic diisocyanates and mixtures thereof.

Preferably, the polyisocyanate is a diisocyanate or a triisocyanate which is more preferably selected from 2,2'-, 2,4'-, and 4,4'-diphenylmethane diisocyanate (MDT); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis (isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclo-hexyl isocyanate, 1-isocyanato-3,3,5-trimethyl-5-isocyanatomethylcyclohexane, cyclo-hexyl isocyanate, dicyclohexylmethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, or mixtures thereof.

Especially preferred are aromatic polyisocyanates, such as 4,4'-diphenylmethane diisocyanate (MDI).

The molding composition of the present invention comprises the coupling agent (B) preferably in an amount ranging from 0.1 to 5 weight-%, more preferably ranging from 0.2 to 3 weight-% and most preferably ranging from 0.3 to 1.5 weight-%, wherein the weight is based on the total weight of the composition.

Component (C)

A further component of the composition of the present invention is at least one reinforcing fiber (C).

Reinforcing fibers of which use may advantageously be made are mineral fibers, such as glass fibers, polymer fibers, in particular organic high-modulus fibers, such as aramid fibers, or metal fibers, such as steel fibers, or carbon fibers or natural fibers, fibers from renewable resources.

These fibers may be in modified or unmodified form, e.g. provided with a sizing, or chemically treated, in order to improve adhesion to the plastic. Glass fibers are particularly preferred.

Glass fibers are provided with a sizing to protect the glass-fiber, to smooth the fiber but also to improve the adhesion between the fiber and the matrix material. A sizing usually comprises silanes, film forming agents, lubricants, wetting agents, adhesives, optionally antistatic agents and plasticizers, emulsifiers and optionally further additives.

Specific examples of silanes are aminosilanes, e.g. 3-trimethoxysilylpropylamine, N-(2-aminoethyl)-3-aminopropyltrimethoxy-silane, N-(3-trimethoxysilanylpropyl)ethane-1,2-diamine, 3-(2-aminoethyl-amino)propyltrimethoxysilane, N-[3-(trimethoxysilyl)propyl]-1,2-ethane-diamine.

Film forming agents are for example polyvinylacetates, polyesters and polyurethanes. Sizings based on polyurethanes may be used advantageously.

The reinforcing fibers may be compounded into the polyoxymethylene matrix, for example in an extruder or kneader. However, the reinforcing fibers may also advantageously take the form of continuous-filament fibers sheathed or impregnated with the polyoxymethylene molding composition in a process suitable for this purpose, and then processed or wound up in the form of a continuous strand, or cut to a desired pellet length so that the fiber lengths and pellet lengths are identical. An example of a process particularly suitable for this purpose is the pultrusion process.

According to the invention, the long-fiber-reinforced polyoxymethylene molding composition may be a glass-fiber bundle which has been sheathed with one or more layers of the polyoxymethylene matrix polymer in such a way that the fibers have not been impregnated and mixing of the fibers and the polyacetal matrix polymer does not take place until processing occurs, for example injection molding. However, the fibers have advantageously been impregnated with the polyacetal matrix polymer.

According to a preferred embodiment of the invention the reinforcing fibers may also advantageously be impregnated or sheathed in the form of continuous-filament fibers with the remaining parts of the molding composition as defined in the present invention, i.e. the at least one polyoxymethylene (A), the at least one coupling agent (B), the one or more tribological modifier (D) and other optional components such as the at least one formaldehyde scavenger (E), in a process suitable for this process, and then wound up or processed in the form of a continuous strand, or chopped to a desired pellet length, so that the fiber lengths and pellet lengths are equal. An example of a process particularly suited to this purpose is the pultrusion process.

In one preferred embodiment of the invention, the long-fiber-reinforced molding composition of the invention is prepared by the pultrusion process, where i) fiber bundles are conducted through a die charged with a melt made from a polymer matrix comprising at least one polyoxymethylene (A), the at least one coupling agent (B), the one or more tribological modifier (D) and other optional components such as the at least one formaldehyde scavenger (E), ii) the immersed fiber bundles are preferably conducted through a shaping die, iii) the fiber bundles are optionally cooled, iv) the fiber bundles are optionally postformed, and v) the fiber bundles are cut to the length of the structure preferably substantially perpendicular to their running direction, or are wound up in the form of a continuous structure.

The impregnation of the fiber bundles with the polymer matrix, for example via pultrusion in step i) of the above process, may also take place by other suitable processes. For example, the fibers may be impregnated by a process in which the fiber bundle is saturated by the polymer matrix, wherein the fiber bundle is laid onto carrier equipment, and wherein the carrier equipment, together with the fiber bundle lying thereon, is conducted through impregnating equipment. A process of this type is described in EP-A-756 536.

The fiber may also be impregnated by a process in which a plastifying extruder is used and a fiber strand is conducted by way of guide apertures and preheating equipment and is wetted with a liquid-film of the polymer matrix in an impregnating apparatus and then is introduced into the plastifying extruder in which the individual fibers are chopped and mixed, the mixture being discharged in the form of a fiber-reinforced polymer composition of the invention, which may be capable of further processing, wherein the following steps can be used:

a) passing by way of coating nozzles into the inlet of the plastifying extruder, and preferably parallel to the extruder axes and approximately tangentially, the fiber strand is wound up onto an extruder screw and around the extruder screws in an advancing direction, and also drawn into holes in the extruder barrel, whose diameter has been enlarged by at least four times the thickness of the fiber strand, where b) preferably in the inlet the right-hand coating nozzle directly applies a film of polymer to one side of the fiber strand, while application to the second side takes place indirectly by pressing the fiber strand into the liquid film of polymer matrix previously applied from the left-hand coating nozzle to the screw shaft, whereupon the individual continuous-filament fibers are subjected to impregnating or penetrating action at the extruder screws on both flat sides of the fiber strand in an inlet and impregnating section and these sides are wetted or saturated by the liquid films of thermoplastic polymer, c) and preferably then the fiber strand or the individual fibers thoroughly saturated or thoroughly impregnated with polymer matrix are passed out of the inlet and impregnation section by way of a cutting edge into the short discharge and conveying section of a reduced-diameter barrel, and thus chopped into substantially predetermined lengths.

An example of the process of this type is described in DE-A-1 98 36 787.

The environmentally compatible and cost-effective process described preferably gives a small rod-shaped structure of a certain shape. The length of the rod-shaped structure is from 3 to 100 mm, preferably from 4 to 50 mm, and particularly preferably from 5 to 15 mm. The diameter of the rod-shaped structure, also termed a pellet, is generally from 1 to 10 mm, from 2 to 8 mm, and particularly preferably from 3 to 6 mm.

According to a preferred embodiment, the molding composition of the present invention comprises at least one reinforcing fiber which is a mineral fiber, preferably a glass fiber, more preferably a coated or impregnated glass fiber. Glassfibers which are suitable for the molding composition of the present invention are commercially available, e.g. Johns Manville, ThermoFlow®Chopped Strand 753, OCV Chopped Strand 408 A, Nippon Electric Glass Co. (NEG) Chopped Strand T-651.

Preferably, the reinforcing fibers have a diameter of from about 5 microns to about 100 microns.

The reinforcing fibers are preferably present in the molding composition of the present invention in an amount ranging from 5 to 50 wt.-%, preferably 7 to 45 wt.-% and especially preferably from 10 to 40 wt.-%, wherein the weight is based on the total weight of the composition.

Component (D)

The molding composition of the present invention further comprises one or more tribological modifier. Various different types of tribological modifiers may be incorporated into the molding composition of the invention. The tribological modifier may comprise, for instance, polytetrafluoroethylene particles, molybdenum sulfide particles, calcium carbonate particles, polymer particles containing a graft copolymer of an olefin grafted to a polyvinyl or a polyether, graft copolymer particles containing an elastomeric core comprising a polydiene and a hard graft comprised of a (meth)acrylate and/or a (meth)acrylonitrile, ultrahigh-molecular-weight polyethylene particles, stearyl stearate particles, wax particles comprising an aliphatic ester wax comprised of a fatty acid and a monohydric alcohol, a polyethylene wax, silicon oil, or an amide wax, or mixtures thereof. In general, one or more tribological modifiers may be present in the composition in an amount from about 1% to about 50% by weight, preferably in an amount ranging from about 3 to about 30 wt.-%.

Possible tribological modifiers that may be added to the composition include the following:

(1) From 0.1-50.0% by weight, preferably from 1.0-25% by weight, of a polytetrafluoroethylene powder (2) From 0.1-10.0% by weight, preferably from 0.2-5% by weight, particularly preferably from 0.5-2% by weight, of a molybdenum disulfide ($MoS_2$) powder (3) From 0.1-50.0% by weight, preferably from 1.0-25% by weight, of a calcium carbonate (chalk) powder (4) From 0.1-50% by weight, preferably from 1.0-25.0% by weight, particularly preferably from 2.0-10% by weight of a graft copolymer which has an olefin polymer as graft base and, grafted to at least one vinyl polymer or one ether polymer, and/or a graft copolymer which has an elastomeric core based on polydienes and a hard graft composed of (meth) acrylates and/or of (meth)acrylonitriles.

Graft copolymers of the above type are described in EP-A-354,802 and EP-A420,564 or in EP-A-156,285 and EP-A-668,317.

A suitable graft base for the graft copolymers of the first type is in principle provided by any of the olefin polymers or olefin copolymers, e.g. homopolymers, such as polyethylene or polypropylene, or copolymers derived from copolymerizable ethylenically unsaturated monomers, e.g. ethylenepropylene copolymers, ethylene-1-butene copolymers, or copolymers derived from ethylene and glycidyl (meth)acrylate.

Suitable graft monomers are in principle any of the ethylenically unsaturated monomers having polar groups, or other graftable monomers having polar groups, where these modify the polarity of the essentially non-polar graft base, e.g. ethylenically unsaturated carboxylic acids, such as (meth) acrylic acid and derivatives thereof, such as esters, nitriles, or amides, if appropriate in combination with comonomers, such as acrylonitrile, or styrene combined with acrylonitrile.

Particular preference is given to a graft copolymer based on polyethylene or polypropylene grafted with acrylonitrile or with styrene/acrylonitrile. Products of this type are known and are commercially available.

Preferred graft bases for the graft copolymers of the second type are polybutadiene, polyisoprene, and/or polybutadiene/styrene. Suitable graft monomers are in principle any of the ethylenically unsaturated monomers. These are preferably ethylenically unsaturated monomers having polar groups.

Particular preference is given to graft copolymers based on polybutadiene and on a two-shell graft envelope composed of polystyrene and polymethacrylate. Products of this type are known and are available commercially.

(5) From 0.1-50.0%, preferably from 1.0% to 25.0%, of an ultrahigh-molecular-weight polyethylene powder whose molar mass is $>10^6$ g/mol. Products of this type are known and are available commercially. An example of these is the product GUR 4120 and GUR 4150 from Ticona GmbH, Germany.

(6) From 0.1%-10% by weight, preferably from 0.1-5.0% by weight, particularly preferably from 0.5-3% by weight, of stearyl stearate.

(7) from 0.1%-10% by weight, preferably from 0.5-5.0% by weight, particularly preferably from 0.8-2.0% by weight, of a silicone oil, in order to suppress migration of silicone oil out of the moldings, it is advantageous to use a silicone oil whose molar mass is >20,000 g/mol.

In principle, it is possible to use any of the polysiloxanes that are liquid at room temperature (23° C.), as long as their molar mass is at least 20,000 g/mol, preferably from 25,000 to 300,000 g/mol. Typical viscosities of these silicone oils at 25° C. are in the region of from 500 to 300,000 mm$^2$/s. They are particularly preferably dialkylpolysiloxanes, in particular dimethylpolysiloxanes.

(8) From 0.1%-5.0% by weight, preferably from 0.5% to 3.0% by weight, of an oxidized polyethylene wax.

(9) From 0.1%-5.0% by weight, preferably from 0.2-2.0% by weight, of an amide wax.

(10) From 0.1%-5.0% by weight, preferably from 0.5-3.0% by weight, of an aliphatic ester wax composed of a fatty acid and of a monohydric.

(11) From 0.1% to 5.0% by weight, preferably from 0.5-3.0% by weight, of a polyethylene wax.

In a specific embodiment of the present invention the tribological modifier comprises or substantially consists of an ultrahigh-molecular weight polyethylene (UHMW-PE). It has been found that specifically good results could be achieved with molding compositions which comprise coupling agents and reinforcing fibers.

Ultrahigh-molecular-weight polyethylene (UHMW-PE) can be employed for example as a powder, in particular as a micro powder. The use of UHMW-PE significantly reduces wear and improves the sliding properties. The UHMW-PE generally has a mean particle diameter $D_{50}$ (volume based and determined by light scattering) in the range of 1 to 5000 μm, preferably from 10 to 500 μm and particularly preferably from 10 to 150 μm such as 30 to 130 μm or 80 to 150 μm or 30 to 90 μm.

The UHMW-PE can have an average molecular weight of higher than $1.0 \cdot 10^6$ g/mol, preferably higher than $2.0 \cdot 10^6$ g/mol, more preferably higher than $4.0 \cdot 10^6$ g/mol, especially having an average molecular weight ranging from $1.0 \cdot 10^6$ g/mol to $15.0 \cdot 10^6$ g/mol, more especially ranging from $3.0 \cdot 10^6$ g/mol to $12.0 \cdot 10^6$ g/mol, determined by viscosimetry.

Preferably, the viscosity number of the UHMW-PE is higher than 1000 ml/g, more preferably higher than 1500 ml/g, especially ranging from 1800 ml/g to 5000 ml/g, such as ranging from 2000 ml/g to 4300 ml/g (determined according to ISO 1628, part 3; concentration in decahydronaphthalin: 0.0002 g/ml).

Suitable UHMW-PE is commercially available from Ticona GmbH, Germany under the tradename GUR®, such as GUR 4120 and GUR®4150.

In a preferred embodiment the ultrahigh molecular weight polyethylene can be present in an amount up to 30 wt.-%, preferably in an amount ranging from 1 to 25 wt.-%, more preferably ranging from 2.5 to 20 wt.-%, especially 4.5 to 15 wt.-%, such as 5.5 to 12 wt.-%, e.g. 6.5 to 9.5 wt.-%, wherein the amount is based on the total weight of the composition.

Component (E)

According to a preferred embodiment of the present invention the molding composition additionally comprises a formaldehyde scavenger (E).

In the prior art sensitive additives which can react with the coupling agent (B) were believed to be avoided. Consequently, additives which reduce the formaldehyde emission have not been used in the prior art for fiber reinforced polyoxymethylene molding compositions due to the presence of highly reactive isocyanate coupling agents. However, it has surprisingly been found that formaldehyde scavengers can be used in the molding compositions of the present invention and it has been found that the formaldehyde emissions are significantly reduced.

Formaldehyde scavengers are additives for scavenging formaldehyde. Suitable formaldehyde scavengers are nitrogen-containing stabilizers. Mainly, these are heterocyclic compounds having at least one nitrogen atom as hetero atom which is either adjacent to an amino-substituted carbon atom or to a carbonyl group, for example pyridine, pyrimidine, pyrazine, pyrrolidone, aminopyridine and compounds derived therefrom. Advantageous compounds of this nature are aminopyridine and compounds derived therefrom. Any of the aminopyridines is in principle suitable, for example 2,6-diaminopyridine, substituted and dimeric aminopyridines, and mixtures prepared from these compounds. Other advantageous materials are polyamides and dicyane diamide, urea and its derivatives and also pyrrolidone and compounds derived therefrom. Examples of suitable pyrrolidones are imidazolidinone and compounds derived therefrom, such as hydantoines, derivatives of which are particularly advantageous, and those particularly advantageous among these compounds are allantoin and its derivatives. Other particularly advantageous compounds are triamino-1,3,5-triazine (melamine) and its derivatives, such as melamine-formaldehyde condensates and methylol melamine. Very particular preference is given to melamine, methylol melamine, melamine-formaldehyde condensates, and allantoin. Oligomeric polyamides are also suitable in principle for use as formaldehyde scavengers. The formaldehyde scavenger may be used individually or in combination.

Further, the formaldehyde scavenger (E) can be a guanidine compound which can include an aliphatic guanamine-based compound, an alicyclic guanamine-based compound, an aromatic guanamine-based compound, a hetero atom-containing guanamine-based compound, or the like.

Examples of the aliphatic guanamine-based compounds include monoguanamines such as acetoguanamine, valeroguanamine, caproguanamine, heptanoguanamine, capryloguanamine or stearoguanamine; alkylene bisguanamines such as succinoguanamine, glutaroguanamine, adipoguanamine, pimeloguanamine, suberoguanamine, azeloguanamine or sebacoguanamine.

Examples of the alicyclic guanamine-based compounds include monoguanamines such as cyclohexanecarboguanamine, norbornene carboguanamine, cyclohexenecarboguanamine or norbornane carboguanamine; and derivatives thereof in which the cycloalkane residue is substituted with 1 to 3 functional groups such as alkyl group, hydroxy group, amino group, acetoamino group, nitrile group, carboxy group, alkoxycarbonyl group, carbamoyl group, alkoxy group, phenyl group, cumyl group or hydroxyphenyl group.

Examples of the aromatic guanamine-based compounds are monoguanamines such as benzoguanamine and derivatives thereof in which the phenyl residue is substituted with 1 to 5 functional groups such as alkyl group, hydroxy group, amino group, acetoamino group, nitrile group, carboxy group, alkoxy carbonyl group, carbamoyl group, alkoxy group, phenyl group, cumyl group or hydroxyphenyl group, (for example, toluguanamine, xyloguanamine, phenylbenzoguanamine, hydroxybenzoguanamine, 4-(4'-hydroxyphenyl)benzoguanamine, nitrilebenzoguanamine, 3,5-dimethyl-4-hydroxybenzoguanamine, 3,5-di-t-butyl-4-hydroxybenzoguanamine, and the like), naphthoguanamine and derivatives thereof in which the naphthyl residue is substituted with the above functional group; polyguanamines such as phthaloguanamine, isophthaloguanamine, terephthaloguanamine, naphthalene diguanamine or biphenylene diguanamine; aralkyl- or aralkylene-guanamines such as phenylacetoguanamine, [beta]-phenylpropioguanamine or xylylene bisguanamine.

Examples of the heteroatom-containing guanamine-based compound include acetal group-containing guanamines such as 2,4-diamino-6-(3,3-dimethoxypropyl-s-triazine; dioxane ring-containing guanamines such as [2-(4',6'-diamino-s-triazin-2'-yl)ethyl]-1,3-dioxane or [2-(4',6'-diamino-s-triazin-2'-yl)ethyl]-4-ethyl-4-hydroxymethyl-1,3-dioxane; tetraoxospiro ring-containing guanamines such as CTU-guanamine or CMTU-guanamine; isocyanuric ring-containing guanamines such as 1,3,5-tris(2-(4',6'-diamino-s-triazin-2'-yl) ethyl)isocyanurate or 1,3,5-tris[3-(4',6'-diamino-s-triazin-2'-yl)propyl]-isocyanurate); imidazoyl ring-containing guanamines such as guanamine compounds described in JP-A 6-179671 and JP-A 7-10871; imidazole ring-containing guanamines such as guanamine compounds described in JP-A 47-41120, JP-A 3-284675 and JP-A 7-33766; and guanamine compounds described in JP-A 2000-154181, and the like.

Furthermore, the guanamine-based compound includes a compound in which the hydrogen atom of the amino group of the aforementioned guanamine-based compound is substituted with an alkoxymethyl group such as mono- to tetra-methoxymethylbenzoguanamine, mono- to octa-methoxymethyl-CTU-guanamine, or the like.

Among these guanamine-based compounds, particularly preferable are guanamine, acetoguanamine, benzoguanamine, and CTU-guanamine.

Further formaldehyde scavengers (E) which are linked to oligomers or polymers are also suitable. Examples of these groups of formaldehyde scavengers are shown in formula I.

$$R^1-[X-CO-NH-R^3-NH-CO-NR^2-R^4]_o \quad (I),$$

wherein $R^1$ is a moiety comprising 2 to 20 carbon atoms, preferably an aliphatic or aromatic rest, more preferably the aliphatic or aromatic rest of a polyhydroxy or a polyamino compound having at least 2, preferably 2 to 6 hydroxy and/or amino groups, X is —O— or —NR²—

$R^2$ is H, alkyl, cycloalkyl, aryl or aralkyl, $R^3$ is alkylene, cycloalkylene, arylene or aralkylene, $R^4$ is a moiety selected from the formula II, III, IV, V, VI and VII

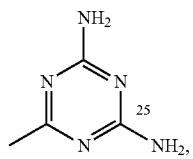
(II)

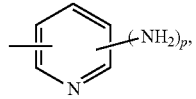
(III)

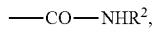 (IV)

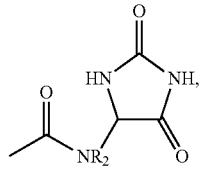
(V)

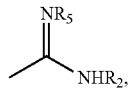
(VI)

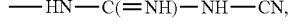
(VII)

wherein $R^s$ is H, —CO—CH₃ or —CO—C₆H₅, o is an integer ranging from 2 to 6 and p is 1 or 2.

Additionally, suitable formaldehyde scavengers (E) are imidazolidine-2-one compounds. Preference is given to imidazolidine-2-one compounds of the following formula:

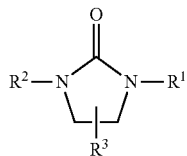

wherein $R^1$ and $R^2$ are independently from each other H, $C_1$-$C_{20}$-alkyl, OR4, —NO₂, hydroxyalkyl having 1 to 10 carbon atoms, $R^3$ is H, $C_1$-$C_{20}$ alkyl which is optionally substituted, keto group, aldehyde group, —COOR4, amine or amide group, or an aromatic ring having 5 to 10 carbon atoms, $R^4$ is a $C_1$-$C_4$-alkyl.

Especially preferred imidazolidine-2-one compounds are:

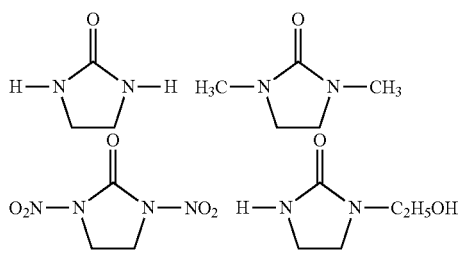

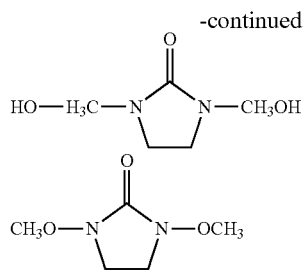

It has been surprisingly found that aromatic formaldehyde scavengers (E) are very suitable for the molding compositions of the present invention.

According to a preferred embodiment of the present invention, the formaldehyde scavenger (E) has a melting point higher than 235° C., preferably higher than 250° C., more preferably higher than 280° C., most preferably higher than 300° C. and especially higher than 320° C. Further, it has been found that the pKa value of the formaldehyde scavenger (E) may influence the formaldehyde emission. According to a preferred embodiment, the formaldehyde scavenger (D) has a pKa value ranging from 4.5 to 10, preferably from 4.5 to 6.5.

Further, preference is given to a formaldehyde scavenger (E) which has at least one triazine moiety. The use of formaldehyde scavengers which comprise at least one triazine moiety does not only have excellent formaldehyde reducing properties but also positively influences the mechanical properties of the molding composition. Preferred formaldehyde scavengers (E) which comprise a triazine moiety are selected from the group consisting of guanamine, melamine, N-butylmelamine, N-phenylmelamine, N,N-diphenylmelamine, N,N',N"-triphenylmelamine, benzoguanamine, acetoguanamine, 2,4-diamino-6-butyl-sym-triazine, ammeline, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine, 1,1-bis(3,5-diamino-2,4,6-triazinyl) methane, 1,2-bis(3,5-diamino-2,4,6-triazinyl)ethyne (other name: succinoguanamine), 1,3-bis(3,5-diamino-2,4,6-triazinyl)propane, 1,4-bis(3,5-diamino-2,4,6-triazinyl)butane, methylenated melamine, ethylenedimelamine, triguanamine, melamine cyanurate, ethylene dimelamine cyanurate and triguanamine cyanurate.

These triazine derivatives may be used singly or in combinations of two or more compounds. Guanamines and melamine are preferred, and melamine is particularly preferable.

Preferred formaldehyde scavengers (E) are hydrazides, more preferably dihydrazides such as sebacic dihydrazide (SDH).

Examples of the hydrazide compound which can be used in the present invention as formaldehyde scavenger (E) include an aliphatic carboxylic acid hydrazide-based compound, an alicyclic carboxylic acid hydrazide-based compound, an aromatic carboxylic acid hydrazide-based compound, hetero atom-containing carboxylic acid hydrazide-based compound, a polymer-type carboxylic acid hydrazide-based compound, and the like. These carboxylic acid hydrazides can be used alone or in combination of two or more of them.

Examples of the aliphatic carboxylic acid hydrazide-based compound include: monocarboxylic acid hydrazide (lauric acid hydrazide, stearic acid hydrazide, 12-hydroxystearic acid hydrazide 1,2,3,4-butane tetracarboxylic acid hydrazide or the like); polycaboxylatic acid hydrazide such as succinic acid mono- or di-hydrazide, glutaric acid mono- or di-hydrazide, adipic acid mono- or di-hydrazide, pimelic acid mono- or di-hydrazide, suberic acid mono- or di-hydrazide, azelaic acid mono- or di-hydrazide, sebacic acid mono- or di-hydrazide, dodecanedioic acid mono- or di-hydrazide, hexadecane dioic acid mono- or di-hydrazide, eicosandioic acid mono- or di-hydrazide, 7,11-octadecadiene-1,18-dicarbohydrazide, and the like. Examples of the alicyclic carboxylic acid hydrazide-based compound include: monocarboxylic acid hydrazides such as cyclohexane carboxylic acid hydrazide; and polycarboxylic acid hydrazides such as dimer acid mono- or di-hydrazide, trimer acid mono- to tri-hydrazide, 1,2-, 1,3-, or 1,4-cyclohexane dicarboxylic acid mono- or di-hydrazide, cyclohexane tricarboxylic acid mono- to tri-hydrazide, and the like. Examples of the aromatic carboxylic acid hydrazide include: mono-carboxylic acid hydrazides (benzoic acid hydrazide and functional group substitution products thereof, such as derivatives where functional groups such as alkyl group, hydroxy group, acetoxy group, amino group, acetoamino group, nitrile group, carboxy group, alkoxycarbonyl group, carbamoyl group, alkoxy group, phenyl group, benzyl group, cumyl group, or hydroxyphenyl group are substituted by 1 to 5 phenyl residues of benzoguanamine (for example, o-toluic acid hydrazide, m-toluic acid hydrazide, p-toluic acid hydrazide, 2,4-, 3,4-, 3,5- or 2,5-dimethyl-benzoic acid hydrazide, o-, m- or p-hydroxy-benzoic acid hydrazide, o-, m- or p-acetoxy-benzoic acid hydrazide, 4-hydroxy-3-phenyl-benzoic acid hydrazide, 4-actoxy-3-phenyl-benzoic acid hydrazide, 4-pheny-benzoic acid hydrazide, 4-(4'-phenyl)benzoic acid hydrazide, 4-hydroxy-3,5-dimethyl-benzoic acid hydrazide, 4-hydroxy-3,5-di-t-butyl-benzoic acid hydrazide, 4-hydroxy-3,5-di-t-butylphenyl-benzoic acid hydrazide, and 4-hydroxy-3,5-di-t-butylphenyl-propionic acid hydrazide); [alpha]- or [beta]-naphthoic acid hydrazide and functional substitution products thereof, such as 1-naphthoic acid hydrazide, 2-naphthoic acid hydrazide, 3-hydroxy-2-naphthoic acid hydrazide, or 6-hydroxy-2-naphthoic acid hydrazide; and polycarboxylic acid hydrazides such as isophthalic-acid mono- or di-hydrazide, terephthalic acid mono- or di-hydrazide, 1,4- or 2,6-naphthalene dicarboxylic acid mono- or di-hydrazide, 3,3'-, 3,4'- or 4,4'-diphenyldicarboxylic acid mono- or di-hydrazide, diphenylether dicarboxylic acid mono- or di-hydrazide, diphenylmethane dicarboxylic acid mono- or di-hydrazide, diphenylethane dicarboxylic acid mono- or di-hydrazide, diphenoxyethane dicarboxylic acid mono- or di-hydrazide, diphenylsulphone dicarboxylic add mono- or di-hydrazide, diphenylketone dicarboxylic acid mono- or di-hydrazide, 4,4'''-terphenyl dicarboxylic acid mono- or di-hydrazide, 4,4''''-quaterphenyldicarboxylic acid mono- or di-hydrazide, 1,2,4-benzene tricarboxylic acid mono- to tri-hydrazide, pyromellitic acid mono- to tetra-hydrazide, and 1,4,5,8-naphthoic acid mono- to tetra-hydrazide).

Examples of the heteroatom-containing carboxylic acid hydrazide-based compound include: mono- or di-hydrazide of dioxane ring-containing carboxylic acid hydrazides such as 5-methylol-5-ethyl-2-(1,1-dimethyl-2-carboxyethyl)-1,3-dioxane; tetraoxo Spiro ring-containing carboxylic acid hydrazides such as mono- or di-hydrazide of 3,9-bis(2-carboxyethyl)-2,4,8,10-tetraoxospiro[5,5]undecane, mono- or di-hydrazide of 3,9-bis(2-methoxycarbonylethyl)-2,4,8,10-tetraoxospiro[5,5]undecane, mono- or di-hydrazide of 3,9-bis(1,1-dimethyl-1-carboxymethyl)-2,4,8,10-tetraoxospiro[5,5]undecane, or mono- or di-hydrazide of 3,9-bis(1,1-dimethyl-1-methoxycarbonylmethyl)-2,4,8,10-tetraoxospiro[5,5]undecane; isocyanuric ring-containing carboxylic acid hydrazides such as mono- to tri-hydrazide of 1,3,5-tris[2- carboxyethyl]isocyanulate, or mono- to tri-hydrazide of 1,3, 5-tris(3-caboxypropyl)isocyanurate; and hydantoin ring-containing carboxylic acid hydrazides such as 1,3-bis(2-hydrazinocarbonylethyl)5-isopropyl hydantoin.

The polymer-type carboxylic acid hydrazide-based compounds are exemplified as follows: single polymers or copolymers of poly(meth)acrylic acid hydrazides which may be cross-linked compounds, such as olefin copolymer, vinyl monomer copolymer, styrene copolymer of divinylbenzene crosslinked compound, or bis(meth)acrylic ester crosslinked compound; polymer described in 3P-A 55-145529 and JP-A 56-105905; commercially available "amino polyacrylic amide APA" Otsuka Chemical Co., Ltd.; and copolymer described in U.S. Pat. No. 3,574,786.

Further, dicyandiamide (DCD) can be used as component (E).

Further, zeolites can be used as component (E).

According to a preferred embodiment of the present invention, the formaldehyde scavenger (E) has at least one —$NH_2$, preferably at least two —$NH_2$ groups, most preferably at least three —$NH_2$ groups.

It has surprisingly been found that an excellent performance can be achieved with a formaldehyde scavenger (E) which has a melting point which is at least 10° C., preferably at least 20° C., more preferably at least 30° C., even more preferably at least 50° C. higher than the melting point of the polyoxymethylene (A). Especially preferred as a formaldehyde scavenger (E) is melamine.

The formaldehyde scavenger (E) is preferably present in the composition in an amount of up to 2 weight-%, more preferably in an amount ranging from 0.001 to 1.5 wt.-%, further more preferably ranging from 0.01 to 1.0 wt.-%, most preferably ranging from 0.05 to 0.5 wt.-% and especially ranging from 0.08 to 0.3 weight-%, wherein the weight is based on the total weight of the composition.

The molding materials or moldings according to the invention can optionally be stabilized and/or modified by known additives. Such stabilizers and processing auxiliaries other than the components (C) to (E) (defined above) can be used as optional component (F). Possible additives and processing auxiliaries are known to the person skilled in the art.

Component (F) is usually present in an amount up to 10 wt.-%, preferably from 0.1 to 5 wt.-%, more preferably from 0.2 to 4 wt.-%, especially 0.5 to 3 wt.-%, wherein the amount is based on the total weight of the composition.

The stabilizers are, for example, antioxidants, acid scavengers, UV stabilizers or heat stabilizers. In addition, the molding material or the molding may contain processing auxiliaries, for example adhesion promoters, lubricants, nucleating agents, demolding agents, fillers, or antistatic agents and additives which impart a desired property to the molding material or to the molding, such as dyes and/or pigments and/or impact modifiers and/or additional tribological additives other than component (D) and/or glass beads and/or additives imparting electrical conductivity; and mixtures of these additives, but without limiting the scope to said examples.

A specially preferred molding composition of the invention comprises a) 40 to 90 wt.-%, preferably 55 to 85 wt.-% of one or more polyoxymethylene(s)(A), b) 0.2 to 3.0 wt.-%, preferably 0.3 to 1,5 wt.-% of one or more coupling agent(s) (B), preferably an aromatic polyisocyanate, c) 5 to 45 wt.-%, preferably 10 to 40 wt.-% of one or more reinforcing fiber(s) (C), preferably glassfiber(s), d) 1 to 25 wt.-%, preferably ranging from 2.5 to 20 wt.-% of one or more tribological modifier, preferably of a ultrahigh molecular weight polyethylene (UHMW-PE), optionally together with further tribological modifier, especially polytetrafluoroethylene particle; and e) optionally 0.05 to 0.5 wt.-%, preferably 0.08 to 0.3 wt.-% of one or more formaldehyde scavenger (E), preferably an aromatic formaldehyde scavenger, more preferably a formaldehyde scavenger having a melting point higher than 235° C., most preferably a formaldehyde scavenger having a melting point which is at least 10° C. higher than the melting point of the polyoxymethylene (A), and especially preferable melamine or a melamine derivative; wherein the weight is based on the total weight of the composition.

The reaction of the components is typically effected at temperatures from 100 to 260° C., such as from 150 to 220° C., and the duration of mixing is typically from 0.2 to 60 minutes.

A further embodiment of the present invention is a process for the manufacturing of a molding composition of the present invention comprising the following step of melt mixing a composition comprising at least one polyoxymethylene (A),
at least one coupling agent (B),
at least one reinforcing fiber (C),
an ultrahigh molecular weight polyethylene (D) and
optionally at least one formaldehyde scavenger (E), at a temperature ranging from 120° C. to 260° C.

A preferred embodiment of the process comprises melt mixing a composition comprising:

at least one polyoxymethylene (A),
at least one coupling agent (B),
at least one reinforcing fiber (C),
one or more tribological modifier (D), preferably an ultrahigh molecular weight polyethylene (D) and
at least one formaldehyde scavenger (E)
at a temperature ranging from 120° C. to 260° C. wherein the melting point of the formaldehyde scavenger is at least 10° C. higher than the melt mixing temperature.

The preferred ranges referred to above in conjunction with the composition of the invention apply also to the process of the invention.

A further embodiment of the invention is a molding composition which is obtainable by the process of the invention.

In one embodiment, the molding composition of the present disclosure is reacted together and compounded prior to being used in a molding process. For instance, in one embodiment, the different components can be melted and mixed together in a conventional single or twin screw extruder at a temperature described above. Extruded strands may be produced by the extruder and pelletized. Prior to compounding, the polymer components may be dried to a moisture content of about 0.05 weight percent or Tess. If desired, the pelletized compound can be ground to any suitable particle size, such as in the range of from about 100 microns to about 500 microns.

A further embodiment of the present invention is a molded part obtainable by molding a molding composition of the present invention.

The molded parts demonstrate the excellent balance of mechanical properties as mentioned above.

Preferably, the molded parts demonstrate an elongation at break (5 mm/min) of higher than 2.6%, more preferably higher than 2.8%, especially higher than 3.0%, determined according to ISO 527.

Further, preferably the Charpy notched impact strength (determined at 23° C. according to ISO 179-1/1eA(CNI)) is higher than 10.0, more preferably higher than 10.5 kJ/m².

The molded parts show an excellent tribological behavior. The molded parts show preferably a wear rate lower than 15 μm/h, preferably lower than 12 μm/h (Tribology (wear rate versus steel; roughness $R_z$=1 μm) was measured by a ball-on-3 plates test setup (MCR 301 test, v=100 mm/s, F=5N) from Anton Paar Germany GmbH).

The coefficient of friction is preferably lower than 0.35, more preferably lower than 0.33, especially lower than 0.30.

Preferred molded parts are parts used in the automotive industry, especially housings, latches, window winding systems, pulleys, wiper systems, sun roof systems, seat adjustment, levers, gears, claws, pivot housings, brackets or wiper arms.

The molded parts can be obtained by the molding techniques known in the art such as extrusion, injection molding thermoforming, blow molding, rotational molding and the like.

The molding composition of the present invention is especially suitable to be used in the manufacturing of molded parts used in the automotive industry. Thus, a further embodiment of the present invention is the use of the composition according to the present invention for the manufacturing of molded parts used in the automotive industry.

Due to the excellent mechanical properties and the low formaldehyde emission the molding composition of the invention can be used for several applications where stiffness, tensile strength and high impact resistance are desired.

A further embodiment is the use of the composition or molded parts of the present invention for housings, latches, window winding systems, pulleys, wiper systems, sun roof systems, seat adjustment, levers, gears, claws, pivot housings, brackets or wiper arms.

A further embodiment of the invention is the use of a polymer matrix comprising at least one polyoxymethylene (A), the at least one coupling agent (B), the one or more tribological modifier (D) and other optional components such as the at least one formaldehyde scavenger (E), for the impregnation of continuous-filament fibers. Preferably the polymer matrix is used in a pultrusion process.

EXAMPLES

The following components were used in the Examples:

A: polyoxymethylene with a content of 3,4 wt. % dioxolane comonomer; portion of terminal OH groups: 20-25 mmol/kg; melting point: 165° C.; MVR: 8 cm³/10 min.
B: Methylenediphenyl-4,4'-diisocyanate (MDI)
C: reinforcing fiber (NEG ECS 03 T-651H); sized glass fiber
D: UHMW-PE
E: melamine
F: other additives (antioxidants, nucleating agents)

All components beside the glass fiber were mixed together. For the compounding a ZSK 25MC, (Werner&Pfleiderer, Germany) was used (zone temperature 190° C., melt temperature about 210° C.). The glass fiber was added using a downstream feeding unit at a suitable position. The screw configuration with kneading elements was chosen so that effective thorough mixing of the components took place during the reactive extrusion as well as an optimal glass fiber length was obtained.

Unless indicated otherwise all determinations have been carried out at room temperature (23° C.).

The testing of the prepared molding compositions was performed according to the following standards:

MVR (190° C.; 2.16 kg): ISO 1133;

Charpy notched impact strength: determined at 23° C. according to ISO 179-1/1eA(CNI);

Tensile modulus, stress at break and elongation at break have been determined according to ISO 527;

Portion of terminal OH groups in POM has been determined as described in K. Kawaguchi, E. Masuda, Y. Tajima, Journal of Applied Polymer Science, Vol. 107, 667-673 (2008).

Melting point of polyoxymethylene (POM) has been determined with Differential Scanning Calorimetry (DSC); heating rate 10 K/min according to ISO 11357-1, -2, -3.

Tribology (wear rate versus steel; roughness $R_z$=1 μm) was measured by a ball-on-3 plates test setup (MCR 301 test, v=100 mm/s, F=5N) from Anton Paar Germany GmbH.

The results are listed in the following tables.

Table 1 shows the molding compositions of the invention (Example 1 and 3) as well as the comparative examples 2 and 4. The amounts referred to in the table for the components are based on the total weight of the composition.

TABLE 1

| Examples | A % by weight | B % by weight | C % by weight | D type | D wt.-% | E % by weight | F % by weight |
|---|---|---|---|---|---|---|---|
| 1 | 65.19 | 0.5 | 26 | GUR ®4120[1] | 7 | 0.11 | 1.2 |
| 2 | 65.69 | — | 26 | GUR ®4120[1] | 7 | 0.11 | 1.2 |
| 3 | 65.19 | 0.5 | 26 | GUR ®4150[2] | 7 | 0.11 | 1.2 |
| 4 | 65.69 | — | 26 | GUR ®4150[2] | 7 | 0.11 | 1.2 |

[1] GUR ®4120 is a ultrahigh molecular weight polyethylene (available from Ticona GmbH, Germany) having the following properties:
Average molecular weight: 5.0 · 10⁶ g/mol
Viscosity number: 2400 ml/g
$D_{50}$: 120 μm

[2] GUR ®4150 is a ultrahigh molecular weight polyethylene (available from Ticona GmbH, Germany) having the following properties:
Average molecular weight: 9.2 · 10⁶ g/mol
Viscosity number: 3850 ml/g
$D_{50}$: 60 μm Table 2 shows the mechanical properties as well as the friction and wear properties of Examples 1 to 4.

TABLE 2

| Examples | 1 | 2 | 3 | 4 |
|---|---|---|---|---|
| Charpy Notched Impact Strength [kJ/m$^2$] | 12.4 | 8 | 12.2 | 8.9 |
| Charpy Impact Strength [kJ/m$^2$] | 62.6 | 392 | 61.3 | 41.5 |
| Tensile Modulus [MPa] | 8800 | 8500 | 9400 | 8400 |
| Stress at break (5 mm/min.) [MPa] | 136 | 110 | 140 | 110 |
| Elongation at break (5 mm/min.) [%] | 3.3 | 2.3 | 3.2 | 2.5 |
| Coefficient of friction | 0.288 | 0.241 | 0.325 | 0.265 |
| Wear rate vs. steel ($R_z$ = 1 µm) [µm/h] | 13.4 | 8.6 | 23.8 | 12.2 |

The molding compositions of the present invention (Examples 1 and 3) show a good balance between mechanical properties, such as impact resistance and tensile modulus and friction as well as wear properties (which are important especially for automotive applications such as window winding systems or sunroof systems, e.g. pulleys or sliding elements). Further the molding compositions of the invention demonstrate a very low formaldehyde emission which makes the molded parts suitable for applications in the automotive interior.

Table 3 shows the molding compositions of the invention (Examples 5, 7 and 9) as well as comparative examples 6, 8 and 10 to 12. The amounts referred to in Table 3 are based on the total amount of the molding composition.

TABLE 3

| Examples | A % by weight | B % by weight | C % by weight | D type | D % by weight | E % by weight | F % by weight |
|---|---|---|---|---|---|---|---|
| 5 | 66.69 | 0.5 | 25 | GUR 4120 | 7 | 0.11 | 0.7 |
| 6 | 67.19 | — | 25 | GUR 4120 | 7 | 0.11 | 0.7 |
| 7 | 68.69 | 0.5 | 25 | GUR 4120 | 5 | 0.11 | 0.7 |
| 8 | 69.19 | — | 25 | GUR 4120 | 5 | 0.11 | 0.7 |
| 9 | 70.69 | 0.5 | 25 | GUR 4120 | 3 | 0.11 | 0.7 |
| 10 | 71.19 | — | 25 | GUR 4120 | 3 | 0.11 | 0.7 |
| 11 | 73.69 | 0.5 | 25 | — | — | 0.11 | 0.7 |
| 12 | 68.19 | — | 26 | GUR 4120 | 5 | 0.11 | 0.7 |

Table 4 shows the mechanical properties as well as the friction and wear properties of Examples 5 to 12.

TABLE 4

| | 5 | 6 | 7 | 8 | 9 | 10 | 11 | 12 |
|---|---|---|---|---|---|---|---|---|
| Charpy Notched Impact Strength [kJ/m$^2$] | 10.7 | 7.9 | 10.7 | 7.6 | 11.5 | 8.3 | 12.5 | 5.5 |
| Charpy Impact Strength [kJ/m$^2$] | 54.4 | 34.8 | 56.4 | 35.9 | 61.1 | 38.8 | 70 | — |
| Tensile Modulus (1 mm/min.) [MPa] | 8100 | 7900 | 8300 | 8100 | 8700 | 8300 | 9200 | 8700 |
| Tensile Stress at break (5 mm/min.) [MPa] | 121 | 101 | 127 | 108 | 137 | 115 | 150 | 110 |
| Elongation at break (5 mm/min.)[%] | 2.9 | 2.3 | 3.1 | 2.2 | 3.2 | 2.4 | 3.5 | 2.5 |
| Coefficient of friction | 0.28 | 0.25 | 0.28 | 0.27 | 0.30 | 0.31 | 0.44 | 0.28 |
| Wear rate vs. steel ($R_z$ = 1 µm) [µm/h] | 11.1 | 8.8 | 12.0 | 10.8 | 13.5 | 17.2 | 50.9 | 13.3 |

The molding compositions of the present invention (Examples 5, 7 and 9) show a good balance between mechanical properties, such as impact resistance, stress at break and elongation at break and friction and wear properties (which are important especially for automotive applications such as window winding systems or sunroof systems, e.g. pulleys and sliding elements), Further the molding compositions of the invention demonstrate a very low formaldehyde emission which makes the molded parts suitable for applications in the automotive interior. The molding compositions according to the comparative examples are not balanced in terms of mechanical properties and friction and wear properties.

The invention claimed is:

1. A molding composition comprising
   a) at least one polyoxymethylene (A),
   b) at least one coupling agent (B), wherein the coupling agent is a polyisocyanate,
   c) at least one reinforcing fiber (C),
   d) one or more tribological modifier (D) and
   e) optionally at least one formaldehyde scavenger (E).

2. A molding composition according to claim 1, wherein the tribological modifier comprises ultrahigh molecular weight polyethylene having an average molecular weight of higher than $1.0 \cdot 10^6$ g/mol.

3. A molding composition according to claim 1, wherein the tribological modifier comprises an ultrahigh molecular weight polyethylene having a viscosity number of higher than 1000 ml/g (determined according to ISO 1628, part 3; concentration in decahydronaphthalin: 0.0002 g/ml).

4. A molding composition according to claim 1, wherein the tribological modifier comprises an ultrahigh molecular weight polyethylene (UHMW-PE) which has a mean particle diameter $D_{50}$ ranging from 1 to 5000 µm.

5. A molding composition according to claim 1, wherein the tribological modifier comprises ultrahigh molecular weight polyethylene which is present in the molding composition in an amount up to 30 wt.-%, wherein the weight is based on the total weight of the composition.

6. A molding composition according to claim 1, wherein polyoxymethylene (A) is present in an amount ranging from 40 to 90 wt-%, wherein the weight is based on the total weight of the composition.

7. A molding composition according to claim 1, wherein the polyisocyanate is selected from the group consisting of an aliphatic diisocyanate, a cycloaliphatic diisocyanate, an aromatic diisocyanate, and mixtures thereof.

8. A molding composition according to claim 1, wherein the coupling agent (B) is present in an amount ranging from 0.1 to 5 wt.-%, wherein the weight is based on the total weight of the composition.

9. A molding composition according to claim 1, wherein the formaldehyde scavenger (D) has a melting point higher than 235° C., or wherein the formaldehyde scavenger (D) has a pKa value ranging from 4.5 to 10.

10. A molding composition according to claim 1, wherein the formaldehyde scavenger (D) has a melting point which is at least 10° C. higher than the melting point of the polyoxymethylene (A).

11. A molding composition according to claim 1, wherein the formaldehyde scavenger (D) is present in the composition in an amount up to 2 wt.-%, wherein the weight is based on the total weight of the composition.

12. A molded part obtainable by molding a molding composition according to claim 1.

13. A process for the manufacturing of a molding composition according to claim 1 comprising mixing:
at least one polyoxymethylene (A),
at least one coupling agent (B),
at least one reinforcing fiber (C),
one or more tribological modifier (D), comprising an ultrahigh molecular weight polyethylene and optionally at least one formaldehyde scavenger (E) at a temperature ranging from 120° C. to 260° C.

14. A process according to claim 13 comprising melt mixing a composition comprising:
at least one polyoxymethylene (A),
at least one coupling agent (B),
at least one reinforcing fiber (C),
an ultrahigh molecular weight polyethylene (D) and
at least one formaldehyde scavenger (E)
at a temperature ranging from 120° C. to 260° C. wherein the melting point of the formaldehyde scavenger is at least 10° C. higher than the melt mixing temperature.

15. A process according to claim 13, wherein the composition further comprises polytetrafluoroethylene in an amount ranging from 0.1 to 50.0 wt.-%, wherein the weight is based on the total weight of the composition.

16. A molding composition according to claim 1, wherein the tribological modifier comprises an ultrahigh molecular weight polyethylene having an average molecular weight of higher than $1.0 \cdot 10^6$ g/mol and a polytetrafluoroethylene.

17. A molding composition according to claim 16, wherein the polytetrafluoroethylene is present in an amount ranging from 0.1 to 50.0 wt.-%, wherein the weight is based on the total weight of the composition.

18. A molding composition according to claim 7, wherein the polyisocyanate is an aromatic diisocyanate.

19. A molding composition according to claim 1, wherein the formaldehyde scavenger (D) is melamine or a melamine derivative.

20. A molding composition according to claim 1, wherein the reinforcing fiber (C) is a glass fiber.

* * * * *